United States Patent Office 3,227,767
Patented Jan. 4, 1966

3,227,767
PROMOTERS FOR DIMERIZATION
Julian Feldman and Bernard A. Saffer, Cincinnati, Ohio, assignors to National Distillers and Chemical Corporation, New York, N.Y., a corporation of Virginia
No Drawing. Filed Dec. 31, 1962, Ser. No. 248,267
8 Claims. (Cl. 260—666)

This invention relates to the preparation of cycloolefins, and particularly to the production of 1,5-cyclooctadiene.

The prior art shows the production of cycloolefin dimeric compounds from conjugated open chain diolefinic compounds using a catalyst derived from nickel carbonyl by the replacement of at least one carbonyl group thereof with a compound of trivalent nitrogen, phosphorus, or antimony as described by Reed in United States Patents 2,686,208 and 2,686,209, or later modifications thereof. Other dimeric products may also be produced. For example, in the production of 1,5-cyclooctadiene from 1,3-butadiene, 4-vinyl-1-cyclohexene is also formed.

It has now been found that the addition of certain substances, which are herein designated as "promoters," to the reaction mixture will enhance the selectivity of the catalyst so that the ratio of the 1,5-cyclooctadiene to 4-vinyl-1-cyclohexene formed as a product is substantially increased. The activators of this invention are pyrrole, and pyrrole type compounds such as indole, skatole, and carbazole. The chemical formulas of these compounds are given below in order to show the structural relationships.

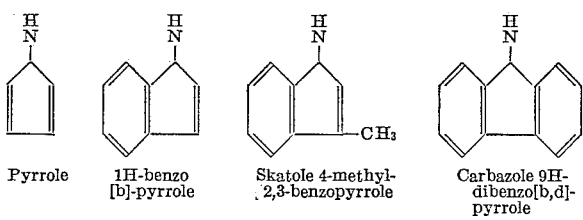

Pyrrole    1H-benzo [b]-pyrrole    Skatole 4-methyl-2,3-benzopyrrole    Carbazole 9H-dibenzo[b,d]pyrrole For the purposes of this invention a "pyrrole type compound" is one which contains in its structure the pyrrole nucleus.

It is an object of this invention to prepare cycloolefin dimers from open chain diolefinic compounds.

A further object of this invention is to provide a process for the preparation of 1,5-cyclooctadiene from 1,3-butadiene in which the ratio of the 1,5-cyclooctadiene to 4-vinyl-1-cyclohexene formed in the product is substantially increased.

Another object of this invention is to afford a promoter for the zerovalent nickel catalyst used in the process for cyclic dimerization of butadiene so as to obtain increased yields of 1,5-cyclooctadiene.

Further objects will be apparent to those skilled in the art from a consideration of the following description.

The starting material for this invention is a conjugated open chain diolefin. The conjugated diolefins especially suitable as starting materials for our invention have from about four to six carbon atoms. The preferred diolefin is 1,3-butadiene; other conjugated open chain diolefins, particularly 1,3-diolefins, are useful, including 2-methyl-1,3-butadiene (isoprene); 2,3-dimethyl-1,3-butadiene; 2-chloro-1,3-butadiene (chloroprene); 2,3-dichloro-1,3-butadiene; 1,3-pentadiene (piperylene); phenyl diolefins, and 2,4-hexadiene; mixed halogen derivatives may be used, including chloro-fluoro-1,3-butadiene.

The nickel catalysts used in our invention are the zerovalent nickel catalysts derived from nickel carbonyl which are known to form cyclic dimers from the above described conjugated open chain diolefins. These catalysts include compounds having the formulas:

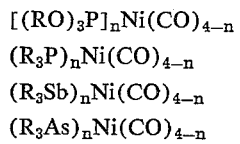

where R is an alkyl, aryl, heterocyclic, or other organic radical, and $n$ has a value of one or two. The preferred nickel catalysts for the process of our invention have the formula:

$$(X_3P)_2Ni(CO)_2$$

where X is $C_6H_5$ or $C_6H_5O$.

The concentration of catalyst has been conveniently utilized at about 1% of the amount of the diolefin charged. However, higher or lower catalyst concentrations are practical. As low as 0.5% of catalyst gives excellent results, and about 3% has been used successfully. A range of from between 0.1 to 10% by weight is practical.

The amount of promotor is adjusted to within a range of from between 0.05% to 30% by weight of the 1,3-butadiene charged, with a preferred range of from 0.5% to about 15%.

The yield of 1,5-cyclooctadiene varies with temperature. The polymerization reaction may be carried out at temperatures within the range of about 70° C. to about 160° C. The preferred range is from about 100° to 130° C. At higher temperatures the rate of formation of 4-vinyl-1-cyclohexene by thermal dimerization of 1,3-butadiene, and also polymerization, becomes appreciable. The rate of formation of 1,5-cyclooctadiene at emperatures below about 70° C. is too low for practical purposes.

Widely varying pressures have been successfully used. By way of example, dimerization according to this invention may take place at atmospheric pressure by dissolving the diolefin in a liquid mixture of solvent, catalyst, and activator, by bubbling the olefin, if gaseous, into the mixture. On the other hand, pressures as high as 1790 p.s.i. have been utilized.

If the reagents are not adequately dry, it is beneficial to pretreat with a dehydrating agent, or to incorporate a dehydrating agent in the reaction mixture. Suitable for this is ethylene oxide, calcium oxide, calcium carbide, and calcium sulfate.

Oxygen must be excluded from the reaction mixture. Even the small traces of oxygen found in ordinary nitrogen are deleterious.

It is desirable, but not essential, to use a polymerization inhibitor such as p-tertiary-butyl catechol to prevent the formation of unwanted by-products. The maximum p-tertiarybutyl catechol concentration tolerable in the reaction mixture is about 0.2% based on 1,3-butadiene. The product ratio decreases when higher concentrations are used. A small amount of polymer is generally formed when less than 0.05% inhibitor is used.

The time is not critical. The reaction is usually substantially complete within ½ to 20 hours. The preferred time is from about 2 to about 15 hours.

When the reaction is complete, the volatile constitutents of the reaction mixture are removed by vacuum distillation or steam distillation from the polymeric material, calcium salts, and catalyst. The volatile constituents are condensed and the condensate fractionally distilled to recover the separate products.

The following examples illustrate methods of carrying out the present invention but it is to be understood that these examples are given for purposes of illustration and not of limitation.

EXAMPLE 1

Into a small stainless steel tube equipped with a valve at one end is charged a reaction mixture of the following components:

Calcium carbide, freshly ground _____gm.____ 0.5
Catalyst stock solution _____ ml.____ 0.3
    p-Tert-butyl catechol, 1 part by weight.
    Bis(triphenyl phosphite) nickel dicarbonyl, 10 parts by weight.
    p-Xylene, 100 parts by weight.
Promoter _____ g____ 0.3
1,3-butadiene, freshly distilled _____ ml____ 4.6

Oxygen is carefully excluded and anhydrous conditions are used. The reaction mixture is heated at 120° C. overnight by placing the tube in an oil bath equipped with thermostatic controls. In the following table the ratio of 1,5-cyclooctadiene to 4-vinyl-1-cyclohexene in the product is shown for several pyrrole compounds. The promoter is commercial grade, used without purification, and the products are analyzed by vapor phase chromatography.

*Table I.—Effect of type of pyrrole compound*
Ratio of 1,5-cyclooctadiene to 4-vinyl-1-cyclolesene
Promoter:
    None _____ 2.9
    Pyrrole _____ 9.1
    Indole _____ 7.7
    Skatole _____ 4.5
    Carbazole _____ 4.1

EXAMPLE 2

Experiments were conducted to determine the effect of the concentration of the promoter, employing the same experimental conditions as in Example 1, but using as promoter in all cases pyrrole in the concentration indicated. The data from such experiments are shown in Table II.

*Table II.—Effect of pyrrole concentration*

| Pyrrole Concentration, percent | Product Compositions, percent | | |
|---|---|---|---|
| | VCH* | COD* | COD/VCH*(1) |
| 0 | 30 | 85 | 2.8 |
| 0.1 | 21 | 77 | 3.7 |
| 0.3 | 16 | 65 | 4 |
| 1.0 | 16 | 80 | 5 |
| 10.0 | 9 | 82 | 9.1 |
| 20.0 | 15 | 64 | 4.3 |

*VCH=4-vinyl-1-cyclohexene, COD=1,5-cyclooctadiene.
(1) Ratio is obtained from vapor phase chromotography curve utilizing an internal xylene standard. Ratio is independent of weight percentages.

Various changes and modifications may be made in carrying out the present invention without departing from the spirit and scope thereof. Insofar as these changes and modifications are within the purview of the annexed claims, they are to be considered as part of the invention.

What is claimed is:

1. In a process for the production of 1,5-cyclooctadiene by contacting 1,3-butadiene with a zerovalent nickel carbonyl catalyst derived from nickel carbonyl by the replacement of at least one of the carbonyl groups by a compound of a trivalent element selected from the group consisiting of phosphorous, antimony, and arsenic, the improvement which comprises admixing a minor amount of a pyrrole type compound with said 1,3-butadiene.

2. The process of claim 1 wherein the pyrrole type compound is pyrrole.

3. The process of claim 1 wherein the pyrrole type compound is indole.

4. The process of claim 1 wherein the pyrrole type compound is skatole.

5. The process of claim 1 wherein the pyrrole type compound is carbazole.

6. The process of claim 1 wherein the catalyst is bis-(triphenyl phosphite) nickel dicarbonyl.

7. The process of claim 1 wherein the catalyst is bis-(triphenyl phosphine) nickel dicarbonyl.

8. In a process for the production of 1,5-cyclooctadiene by contacting 1,3-butadiene with a zerovalent nickel carbonyl catalyst derived from nickel carbonyl by the replacement of at least one of the carbonyl groups by a compound of a trivalent element selected from the group consisting of phosphorous, anitmony, and arsenic at a temperature between about 70° and 160° C., the improvement which comprises admixing a minor amount of a compound having a pyrrole nucleus with said 1,3-butadiene.

References Cited by the Examiner

UNITED STATES PATENTS

| | | | |
|---|---|---|---|
| 2,504,016 | 4/1950 | Foster | 260—666 |
| 2,686,208 | 8/1954 | Reed | 260—666 |
| 2,686,209 | 8/1954 | Reed | 260—666 |
| 2,964,575 | 12/1960 | Sekul et al. | 260—666 |
| 2,972,640 | 2/1961 | Burks et al. | 260—666 |
| 2,991,317 | 7/1961 | Sellers et al. | 260—666 |

DELBERT E. GANTZ, *Primary Examiner.*

ALPHONSO D. SULLIVAN, PAUL M. COUGHLAN,
    *Examiners.*